US009857982B1

United States Patent
Slik et al.

(10) Patent No.: US 9,857,982 B1
(45) Date of Patent: Jan. 2, 2018

(54) STORAGE WAREHOUSE SYSTEMS AND METHODS THEREOF

(71) Applicant: NetApp, Inc., Sunnyvale, CA (US)

(72) Inventors: David Slik, Northridge, CA (US); Peter Corbett, Lexington, MA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 15/699,584

(22) Filed: Sep. 8, 2017

Related U.S. Application Data

(63) Continuation-in-part of application No. 15/143,270, filed on Apr. 29, 2016, now Pat. No. 9,766,811.

(51) Int. Cl.
*G06F 3/06* (2006.01)
*B65G 1/06* (2006.01)

(52) U.S. Cl.
CPC ............ *G06F 3/0605* (2013.01); *B65G 1/06* (2013.01); *G06F 3/0611* (2013.01); *G06F 3/0616* (2013.01); *G06F 3/0626* (2013.01); *G06F 3/0658* (2013.01); *G06F 3/0659* (2013.01); *G06F 3/0686* (2013.01); *G06F 3/0688* (2013.01)

(58) Field of Classification Search
CPC .... G06F 3/0605; G06F 3/0611; G06F 3/0616; G06F 3/0626; G06F 3/0658; G06F 3/0659; G06F 3/0686; G06F 3/0688; B65G 1/06
USPC ............... 711/103, 4, 5, 112, 154, 158, 170; 369/30.06; 710/5; 365/185.33; 700/245; 901/8, 14, 36; 318/568.11
See application file for complete search history.

(56) References Cited

U.S. PATENT DOCUMENTS

| | | | |
|---|---|---|---|
| 6,123,259 | A | 9/2000 | Ogasawara |
| 6,386,450 | B1 | 5/2002 | Ogasawara |
| 6,543,052 | B1 | 4/2003 | Ogasawara |
| 6,976,623 | B1 | 12/2005 | Mambakkam et al. |
| 7,822,687 | B2 | 10/2010 | Brillon et al. |
| 8,156,163 | B1 | 4/2012 | Hamilton et al. |
| 8,261,033 | B1 | 9/2012 | Slik et al. |
| 9,015,286 | B2 | 4/2015 | Nathan et al. |
| 9,015,287 | B2 | 4/2015 | Nathan et al. |
| 9,076,155 | B2 | 7/2015 | Dion et al. |
| 9,164,661 | B2 | 10/2015 | Nathan et al. |
| 9,202,209 | B2 | 12/2015 | Nathan et al. |
| 9,292,166 | B2 | 3/2016 | Rivera et al. |

(Continued)

*Primary Examiner* — Stephen Elmore
(74) *Attorney, Agent, or Firm* — LeClairRyan, a Professional Corporation

(57) ABSTRACT

A storage system includes data storage devices, bus conductors, and mobile reader/writer devices. Each of the storage devices is positioned between insulators, is at one of a plurality of locations on one of one or more shelf assemblies, and comprises a processor coupled to a memory and an interface device. One of the bus conductors is adjacent each of the insulators. Each of the reader/writer devices includes a transport apparatus, a processor and a memory. The transport apparatus is configured to move one of the reader/writer devices to one or more of the locations when engaged. The processor is coupled to the transport apparatus and the memory and is configured to execute machine executable code to: engage the transport apparatus to position one of the reader/writer devices to one of the locations in response to a received operation; couple power to one of the storage devices; and execute the operation.

10 Claims, 7 Drawing Sheets

(56) References Cited

U.S. PATENT DOCUMENTS

| | | |
|---|---|---|
| 9,436,356 B2 | 9/2016 | Nathan et al. |
| 9,513,774 B2 | 12/2016 | Nathan et al. |
| 9,521,375 B2 | 12/2016 | Beaumier et al. |
| 9,766,811 B1 * | 9/2017 | Slik .................... G06F 3/0605 |

* cited by examiner

STORAGE WAREHOUSE SYSTEMS AND METHODS THEREOF

This application is a continuation-in-part of prior U.S. patent application Ser. No. 15/143,270, filed Apr. 29, 2016, now U.S. Pat. No. 9,766,811, which is herein incorporated by reference.

FIELD

This technology relates to data storage networks and, more particularly, to storage warehouse systems and methods thereof.

BACKGROUND

Traditional tape libraries use a robot to move tape cartridges from shelves within a library to one or more tape drives when requested. At that point, the data stored on the tape cartridges can be linearly read since tape is a linear medium.

Unfortunately, tape cartridges have latency and wear limitations and thus are not ideal for the quick and efficient retrieval of data as this reduces the value for long term storage use. Additionally, these traditional tape libraries with robots can be expensive to set up and operate. In particular, they often require precise mechanical engineering to setup and maintain.

DETAILED DESCRIPTION

Figure 1:
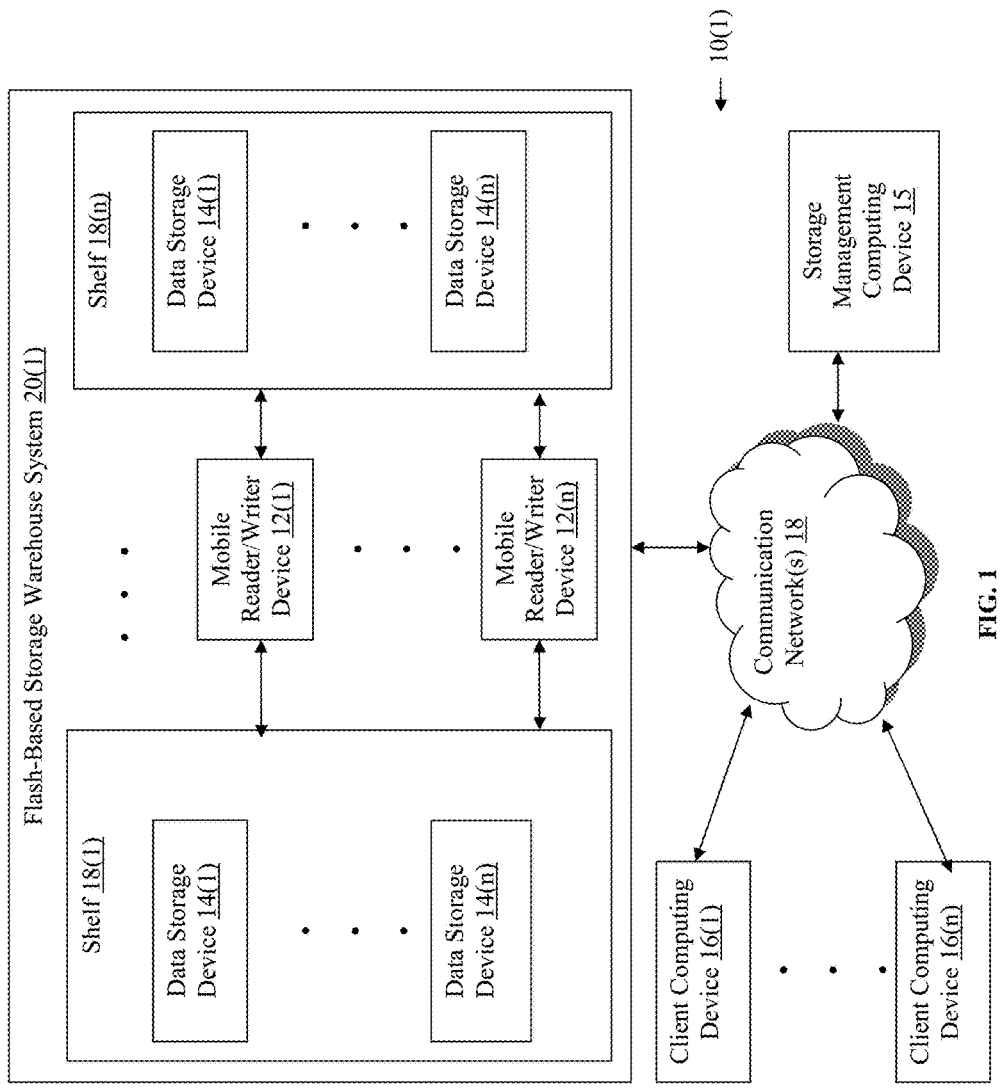
FIG. 1 is a block diagram of an environment with an example of a storage warehouse system.
Figure 2A:
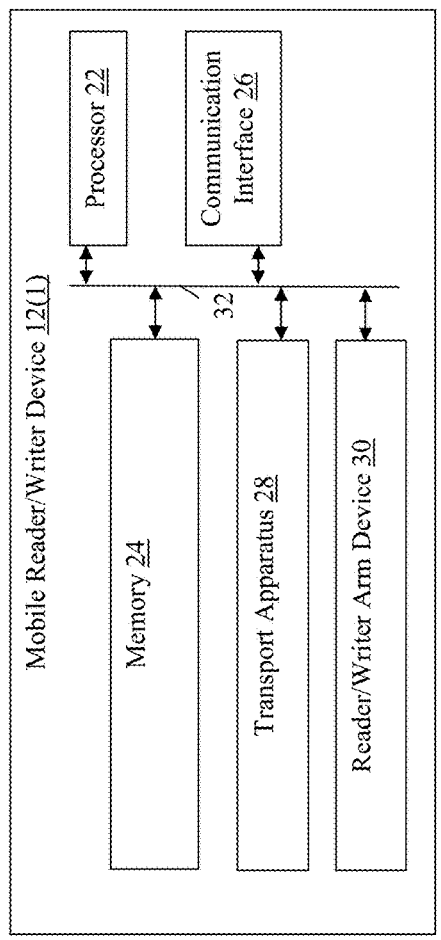
FIG. 2A is a block diagram of an example of a mobile reader/writer device.
Figure 2B:
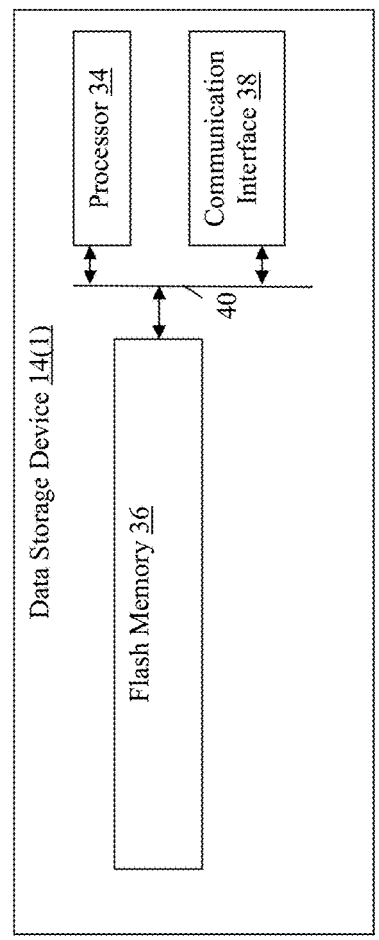
FIG. 2B is a block diagram of an example of a data storage device.

A network environment 10(1) with an example of a storage warehouse system 20(1) is illustrated in FIGS. 1-2B. In this particular example, the environment 10(1) includes the storage warehouse system 20(1) with a plurality of mobile reader/writer devices 12(1)-12(n) and shelves 18(1)-18(n) each with a plurality of data storage devices 14(1)-14(n), a storage management computing device 15, and client computing devices 16(1)-16(n), although the environment 10(1) could include other types and/or numbers of other systems, devices, components, and/or other elements in other configurations. Additionally, the network environment 10(1) may include other network devices, such as one or more routers and/or switches, for example, which are well known in the art and thus will not be described herein. This technology provides a number of advantages including providing an efficient and effective automated storage warehouse system. A portion (or all) of the network environment 10(1) can be located on a company's or other entities premises and/or in one or more data centers providing public, private and/or hybrid cloud comprising infrastructure, platform, and software products or services.

Referring to FIG. 2A, a block diagram of one of the mobile reader/writer device 12(1) is illustrated. In this particular example, the other mobile reader/writer devices 12(2)-12(n) have the same elements, structure, and operation, although each could comprise other types and/or numbers of components, and/or other elements in other configurations. In this particular example, the mobile reader/writer device 12(1) may comprise an autonomous robot device with processor(s) 22, a memory 24, a communication interface 26, a transport apparatus 28, and a reader/writer arm device 30 which are coupled together by a bus 32 or other communication link.

The processor(s) 22 of the mobile reader/writer device 12(1) may execute a program of stored instructions for one or more aspects of this technology, as described and illustrated by way of the embodiments herein, although the processor(s) 22 could execute other numbers and types of programmed instructions. The processor(s) 22 in of the mobile reader/writer device 12(1) may include one or more central processing units (CPUs) or general purpose processors with one or more processing cores, for example. The memory 24 of the mobile reader/writer device 12(1) may include any of various forms of read only memory (ROM), random access memory (RAM), flash memory, non-volatile or volatile memory, or the like, or a combination of such devices, for example.

The communication interface 26 of the mobile reader/writer device 12(1) can include one or more network interface controllers (NICs) for operatively coupling and communicating wirelessly or by hard wire connections between the mobile reader/writer device 12(1) and the storage management computing device 15 and/or one or more of the client computing devices 16(1)-16(n), which are coupled together via one or more communication networks 18, although other types and/or numbers of communication networks or systems with other types and/or numbers of connections and configurations to other devices and elements also can be used.

By way of example only, the communication network(s) 16 can use TCP/IP over Ethernet and industry-standard protocols, including NFS, CIFS, SOAP, XML, LDAP, and SNMP, although other types and/or numbers of communication networks, can be used. The communication network(s) 16 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 16 may also comprise any local area network and/or wide area network (e.g., Internet), although any other type of traffic network topologies may be used.

The transport apparatus 28 in the mobile reader/writer device 12(1) have components and/or other elements configured to physically move the mobile reader/writer device 12(1) to one of a plurality of locations within a set perimeter about the shelves 18(1)-18(n) which each have a plurality of data storage devices 16(1)-16(n) in response to positioning commands from the processor(s) 22, although other types and/or numbers of transport apparatuses could be used.

The reader/writer arm device 30 in the mobile reader/writer device 12(1) is an adjustable electro-mechanical arm configured to extend out to and couple to one of the plurality of data storage devices 16(1)-16(n) in response to commands from the processor(s) 22, although other types and/or numbers of transport apparatuses could be used, including fixed arms that are positioned by transport apparatus 28.

In this particular example, each of the data storage devices 14(1)-14(n) are solid state drives comprising flash memory and collectively comprise an all flash array, although other types of storage devices could be used, such as non-flash storage devices. Each of the data storage devices 14(1)-14(n) may manage one or more elements of stored data based on one or more received management commands, receive one or elements of new data and one or more storage commands via an I/O channel for storage, and/or retrieve and send one or more other elements of the stored data based on or more request commands via the I/O channel, although other types and/or numbers of operations may be executed.

Referring more specifically to FIG. 2B, a block diagram of one data storage device 14(1) is illustrated. In this particular example, the other data storage devices 14(2)-14(n) have the same elements, structure, and operation, although each could comprise other types and/or numbers of components, and/or other elements in other configurations. Additionally in this particular example, the data storage device 14(1) may comprise processor(s) 34, flash memory 36, and a communication interface 38 which are coupled together by a bus 40 or other communication link, although the storage device could comprise other types and/or numbers of components, and/or other elements in other configurations, such as a hard disk drive instead of a flash memory by way of example only.

The processor(s) 34 of the data storage device 14(1) may execute a program of stored instructions for one or more aspects of this technology, as described and illustrated by way of the examples herein, although the processor(s) 34 could execute other numbers and types of programmed instructions. The processor(s) 34 in of the data storage device 14(1) may include one or more central processing units (CPUs) or general purpose processors with one or more processing cores, for example. The memory 36 of the data storage device 14(1) is a flash memory, although other forms and/or types of read only memory (ROM), random access memory (RAM), non-volatile or volatile memory, or the like, or a combination of such devices, for example, could be used.

The communication interface 38 of the data storage device 14(1) can operatively couple and communicate wirelessly or by hard wire connections with the mobile reader/writer device 12(1) to the storage management computing device 15 and/or one or more of the client computing devices 16(1)-16(n) via one or more communication networks 18, although other types and/or numbers of communication networks or systems with other types and/or numbers of connections and configurations to other devices and elements also can be used.

Referring back to FIG. 1 the storage management computing device 15 includes a processor, a memory, a communication interface, and optionally an input device and a display device, which are coupled together by a bus or other link, although the storage management computing device 15 can have other types and/or numbers of components or other elements and other numbers and types of network devices could be used. The storage management computing device 15 may interface between and manage data operations between one or more of the client computing devices 16(1)-16(n) and one or more of the mobile reader/writer devices 12(1)-12(n) including determining a schedule for data operations for one or more of the mobile reader/writer devices 12(1)-12(n) based on received requests and one or more factors, such as the priority of the requests and/or particular location of the data in the data storage devices 14(1)-14(n).

Each of the client computing devices 16(1)-16(n) in this example includes a processor, a memory, a communication interface, and optionally an input device and a display device, which are coupled together by a bus or other link, although each of the client computing devices 16(1)-16(n) can have other types and/or numbers of components or other elements and other numbers and types of network devices could be used. The client computing devices 16(1)-16(n) may run interface applications that provide an interface to make requests for and send content and/or data to the storage node computing device 12 via the communication network(s) 16, for example. Each of the client computing devices 16(1)-16(n) may be a conventional personal computer, a tablet computing device, a smart phone, a virtual machine running in a cloud, an application server hosting applications that utilize backend storage, or other processing and/or computing device, for example.

The storage warehouse system 20(1) defines an outer periphery and has one or more shelf assemblies 18(1)-18(n) which each may have one or more data storage devices 14(1)-14(n) at different physical locations on each of the shelf assemblies 18(1)-18(n), although other types and/or numbers of structures, shelves, and/or memory devices in other configurations may be used.

Although examples of the mobile reader/writer devices 12(1)-12(n), data storage devices 14(1)-14(n) on shelves 18(1)-18(n) in the storage warehouse system 20(1), storage management computing device 15, and client computing devices 16(1)-16(n) are described and illustrated herein, it is to be understood that the devices and systems of the examples described herein are for exemplary purposes, as many variations of the specific electronics, mechanical systems, hardware and/or software are used to implement the examples are possible, as will be appreciated by those skilled in the relevant art(s). In addition, two or more computing systems or devices may be substituted for any one of the computing systems or devices in any of the examples.

The instruction(s), steps(s), and/or actions(s) of this technology as illustrated and/or described by way of the examples herein can be implemented as module or components of an application. Additionally, these instruction(s), steps(s), and/or actions(s) can be implemented as operating system extensions, modules, plugins, or the like. Further, these instruction(s), steps(s), and/or actions(s) may be operative in a cloud-based computing environment. These instruction(s), steps(s), and/or actions(s) also can be executed within virtual machine(s) or virtual server(s) that may be managed in a cloud-based computing environment. Also, these instruction(s), steps(s), and/or actions(s), including one or more whole or parts of the storage management computing device 15 and client computing devices 16(1)-16(n) themselves, may be located in virtual server(s) running in a cloud-based computing environment rather than being tied to one or more specific physical network computing devices. Further, these instruction(s), steps(s), and/or actions(s) may be running in one or more virtual machines (VMs) executing on one or more of the mobile reader/writer devices 12(1)-12(n), data storage devices 14(1)-14(n), storage management computing device 15, and client computing devices 16(1)-16(n).

The examples also may be embodied as one or more non-transitory computer readable media having instructions stored thereon for one or more aspects of the present technology, as described and illustrated by way of the examples herein, which when executed by the processor, cause the processor to carry out the steps necessary to implement the methods of this technology, as described and illustrated with the examples herein.

An example of another network environment 10(2) with an example of another storage warehouse system 20(2) is illustrated in FIGS. 3-6. The storage warehouse system 20(2) has the same in structure and operation as storage warehouse 20(1), except as illustrated or described herein. Additionally, elements in storage warehouse system 20(2) which are like those in storage warehouse system 20(1) will have like reference numbers. Further, the examples of the storage warehouse systems 20(1) and 20(2) can work with all standard drive form factors, with flash and hard disk drives, and with mixed types of storage devices.

Figure 3:
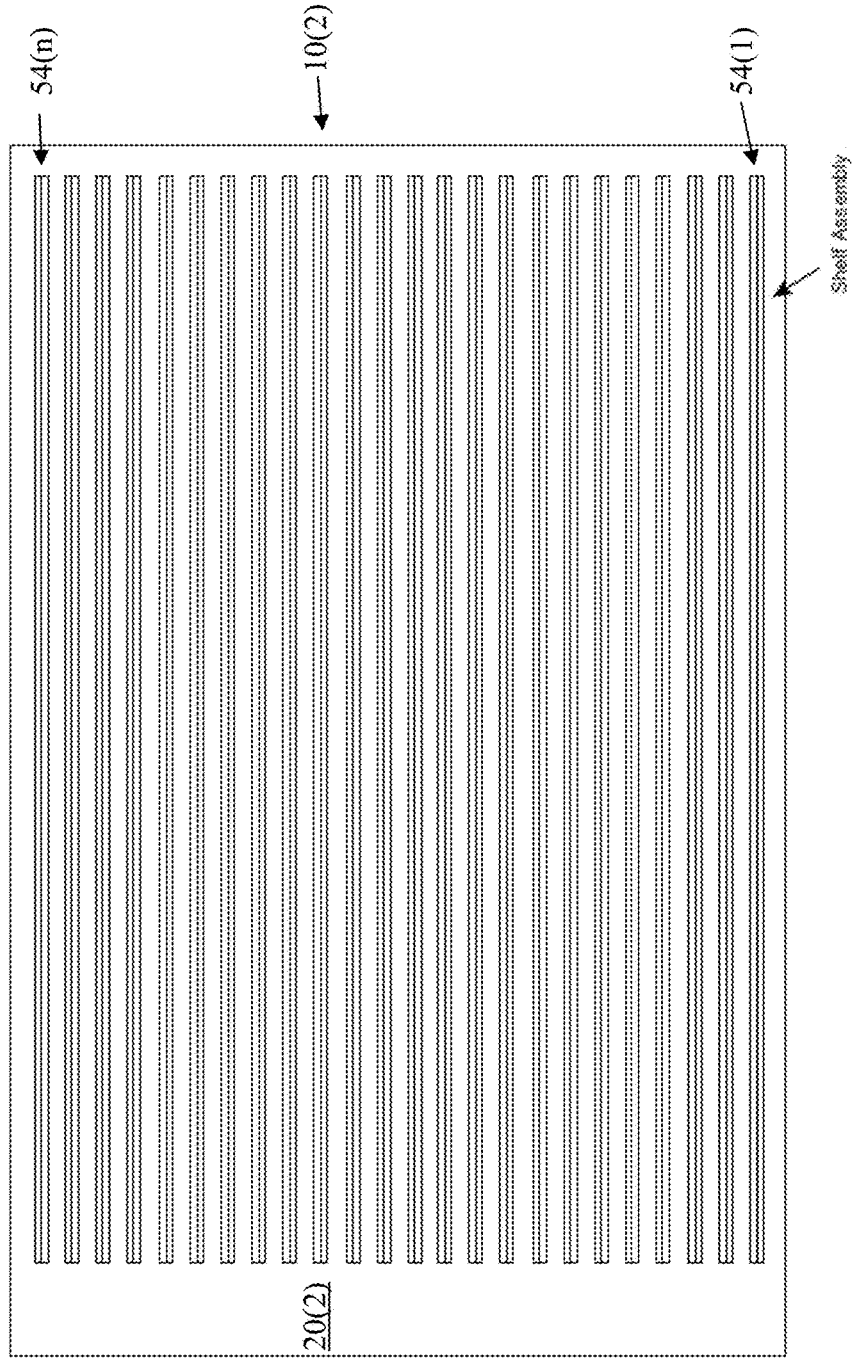
FIG. 3 is a block diagram of another environment with another example of a storage warehouse system.

In this particular example, the storage warehouse system 20(2) includes a plurality of shelf assemblies 54(1)-54(*n*) arranged in parallel as shown in FIG. 3, although the storage warehouse system 20(2) could include other types and/or numbers of other systems, devices, components, and/or other elements in other layouts. The storage warehouse system 20(2) can be scaled vertically to the strength and stability limits of the conductive bars 51 and 53, in this example at least 100 feet, and horizontally without limit. The shelf assemblies 54(1)-54(*n*) have the same structure and operation as shelf assemblies 18(1)-18(*n*), except as otherwise illustrated or described herein.

Figure 4:
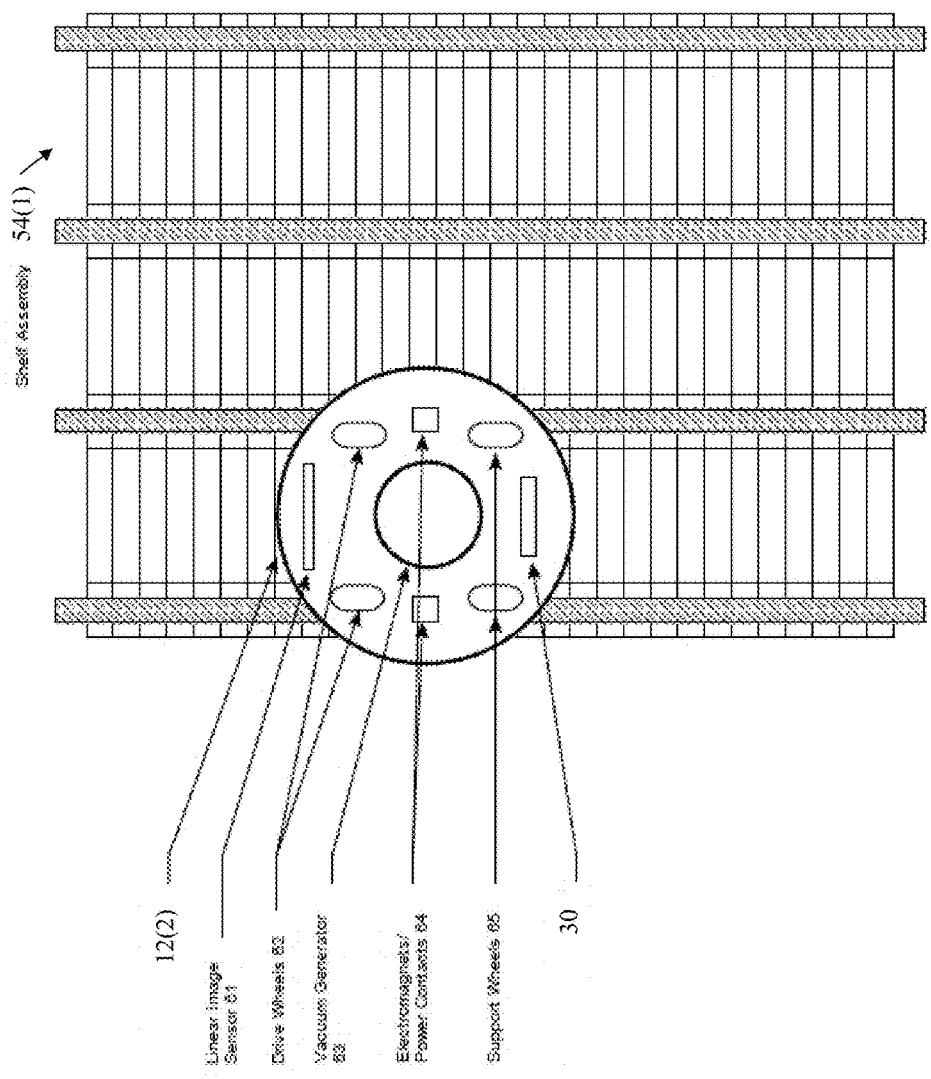
FIG. 4 is a diagram of an example of another example of a mobile reader/writer device on one of the shelf assemblies.

Referring to FIG. 4, an example of an alternative mobile reader/writer device 12(2) on the shelf assembly 54(1) is illustrated. This example of the mobile reader/writer device 12(2) is the same in structure and operation as the example of the mobile reader/writer device 12(1) with the processor, memory, communication interface, transport system, and reader/writer arm device, except as illustrated and described herein. In this particular example, the mobile reader/writer device 12(2) includes the transport apparatus 28 with support wheels 65 which help to guide the mobile reader/writer device 12(2) on the shelf assembly 54(1) and with drive wheels 62 that are coupled to a motor which when activated engages the drive wheels 62 to move and/or rotate the mobile reader/writer device 12(2) along the shelf assembly 54(1), although other transport systems could be used.

The mobile reader/writer device 12(2) also includes a vacuum generator 63 coupled to the processor 22 which when activated detachably secures the mobile reader/writer device 12(2) to the current position on the shelf assembly 52(1), although other types of detachable securing apparatuses could be used. The vacuum generator 63 when activated also can be used to cool the adjacent one of the data storage devices 14(*a*1)-14(*an*) or 14(*b*1)-14(*bn*), although other types of cooling systems can be used.

The mobile reader/writer device 12(2) also has a linear image sensor 61 which is coupled to the processor 22 and is used to identify a location and align the mobile reader/writer device 12(2) on one of the data storage devices 14(*a*1)-14(*an*) or 14(*b*1)-14(*bn*) on the shelf assembly 54(1) in this example, although other types of location and/or alignment systems could be used.

The mobile reader/writer device 12(2) also has electromagnetic power contacts 64 which when aligned can be used to detachably couple each of the electromagnetic power contacts 64 to one of the conductive bus bars 51 and 52 to couple power via the mobile reader/writer device 12(2) to the corresponding one of the of the data storage devices 14(*a*1)-14(*an*) or 14(*b*1)-14(*bn*) on the shelf assembly 54(1), although other types of arrangements for coupling power could be used. In this example, data storage devices 14(*a*1)-14(*an*) or 14(*b*1)-14(*bn*) are the same in structure and operation as data storage devices 14(1)-14(*n*), except as otherwise illustrated or described herein.

Figure 5:
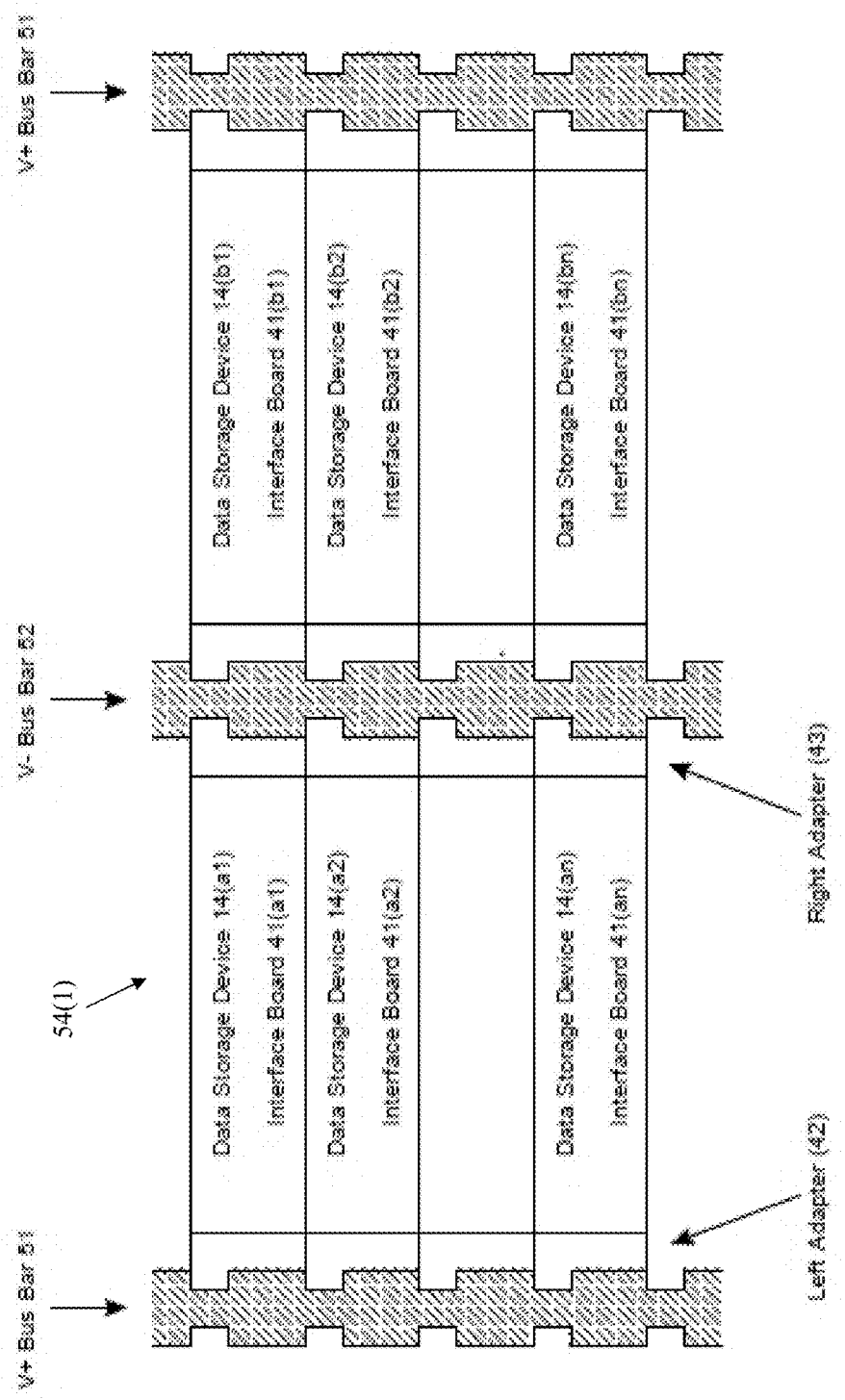
FIG. 5 is a diagram of the shelf assembly with examples of data storage devices.

Referring to FIG. 5, an example of a shelf assembly 54(1) is illustrated. In this example, the other shelf assemblies 54(2)-54(*n*) have the same structure and operation as shelf assembly 54(1), although one or more of the shelf assemblies could have other systems, devices, components, and/or other elements in other configurations. In this example, the shelf assembly 54(1) has two vertical stacks of data storage devices 14(*a*1)-14(*an*) and 14(*b*1)-14(*bn*), although the shelf assembly could have other numbers of storage devices and/or stacks. Each of the data storage devices 14(*a*1)-14(*an*) and 14(*b*1)-14(*bn*) also has on opposing side surfaces insulating left and right adapters 42 and 43, although other types and/or numbers of insulators or other spacers in other configurations could be used. Conductive bus bars 51 and 52 are each positioned adjacent to the insulating left and right adapters 42 and 43 for each of the stacks of the data storage devices 14(*a*1)-14(*an*) and 14(*b*1)-14(*bn*) and are insulated from the data storage devices 14(*a*1)-14(*an*) and 14(*b*1)-14(*bn*), although other configurations for the conductive bus bars could be used. Each of the data storage devices 14(*a*1)-14(*an*) and 14(*b*1)-14(*bn*) also includes a corresponding one of the interface boards or other devices 41(*a*1)-41(*an*) and 41(*b*1)-41(*bn*) at one end which are used to facilitate connections between the data storage devices 14(*a*1)-14(*an*) and 14(*b*1)-14(*bn*) and the mobile reader/writer device 12(2) in this example, although other types of interfaces could be used. Further, in this example, the bus bars 51 and 52, each of the left and right insulating adapters 42 and 43 for each of the data storage devices 14(*a*1)-14(*an*) and 14(*b*1)-14(*bn*), and each of the interface boards or other devices 41(*a*1)-41(*an*) and 41(*b*1)-41(*bn*) at one end of data storage devices 14(*a*1)-14(*an*) and 14(*b*1)-14(*bn*) are all positioned at one end to form a substantially planar surface so that the mobile reader/writer device 12(2) can easily move to a desired location for a data management operation, although other arrangements could be used.

Figure 6:
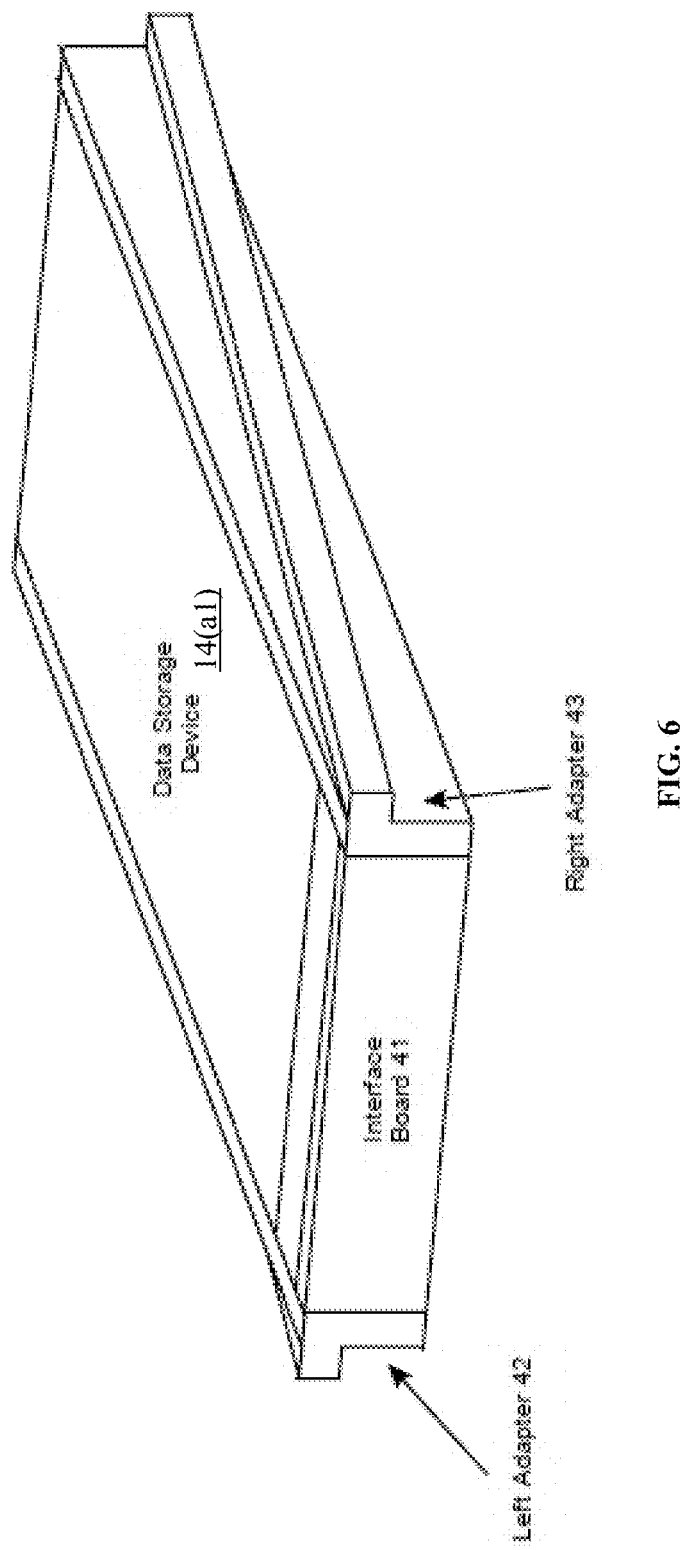
FIG. 6 is a perspective view of an example of one of the data storage devices.

Referring to FIG. 6, an example of a data storage device 14(*a*1) is illustrated. In this example, the other data storage devices 14(*a*1)-14(*an*) and 14(*b*1)-14(*bn*) have the same structure and operation as the data storage device 14(*a*1), although one or more of the data storage devices could have other systems, devices, components, and/or other elements in other configurations. As discussed above, each of the data storage devices 14(*a*1)-14(*an*) and 14(*b*1)-14(*bn*) has one of the left and right insulating adapters 42 and 43 which extend along opposing sides.

An example of a method for operating a storage data warehouse 20(1) will now be described with reference to FIGS. 1-7. The operation of the storage data warehouse 20(2) is the same as the storage data warehouse 20(1), except as otherwise illustrated or described herein.

Figure 7:
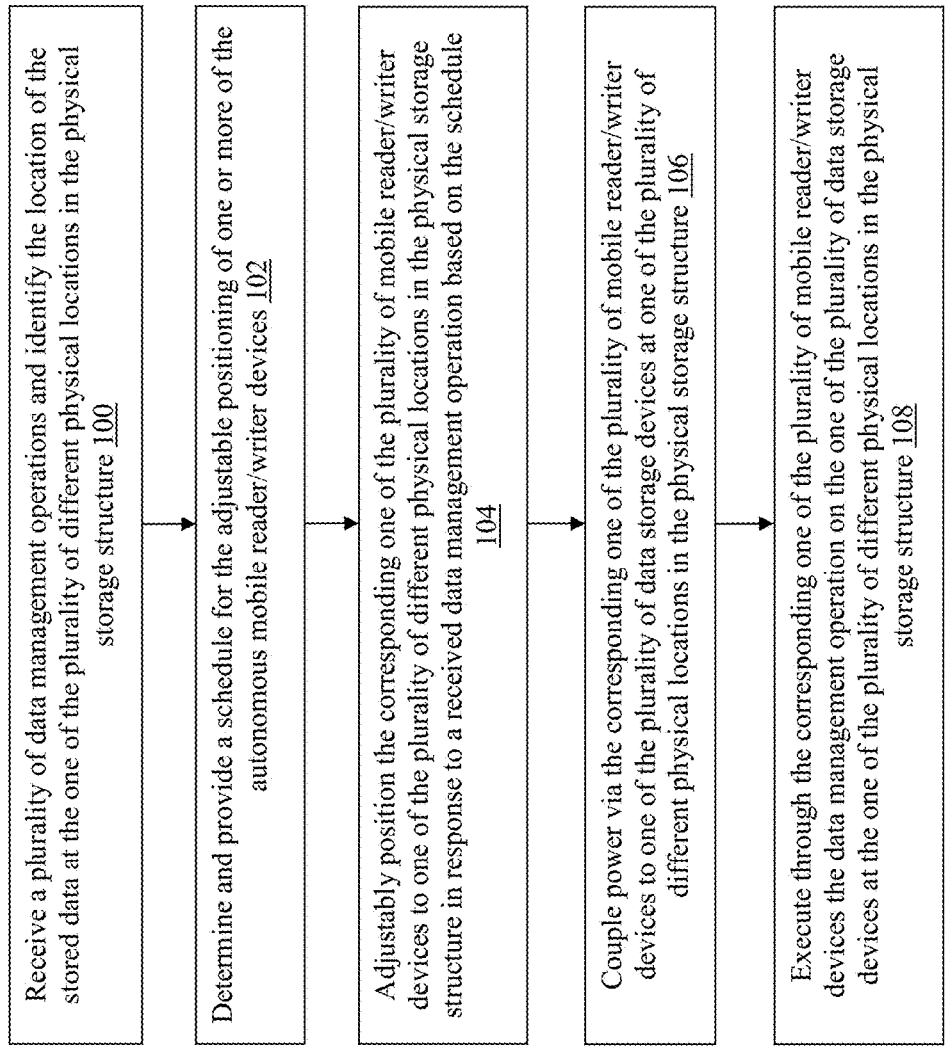
FIG. 7 is a flowchart of an example of a method for operating a storage data warehouse.

Referring more specifically to FIG. 7, in step 100 one or more requests for data management operations, such as a read or a write of data to one of the data storage devices 14(1)-14(*n*) on one of the shelf assemblies 18(1)-18(*n*) in the storage warehouse system 20(1) or a read or a write of data to one of the data storage devices 14(*a*1)-14(*an*) and 14(*b*1)-14(*bn*) on shelf assembly 54(1) in the storage warehouse system 20(2), from one or more of the client computing devices 16(1)-16(*n*) may be received by the storage management computing device 15, although these requests could be received and processed by other devices, such as one or more of the mobile reader/writer devices 12(1)-12(n). In this example the storage management computing device 15 may identify the particular physical location for the data related to each of the requests at one or more of the data storage devices 14(1)-14(n) on one of the shelves 18(1)-18(n) in storage warehouse system 20(1) or in another example at one of data storage devices 14(a1)-14(an) and 14(b1)-14(bn) on shelf assembly 54(1) in storage warehouse system 20(2).

In step 102, the storage management computing device 15 determines a schedule for the adjustable positioning of one or more of the mobile reader/writer devices 12(1)-12(n) in storage warehouse system 20(1) or in another example mobile reader/writer device 12(2) in storage warehouse system 20(2) to service each of these requests, although the schedule could be determined by other devices, such as one or more of the mobile reader/writer devices 12(1)-12(n) in storage warehouse system 20(1) or mobile reader/writer device 12(2) in storage warehouse system 20(2). By way of example, the schedule for processing each of the requests by one or more of the mobile reader/writer devices 12(1)-12(n) in storage warehouse system 20(1) or mobile reader/writer device 12(2) in storage warehouse system 20(2) may be determined based on factors, such as priority of the request, a remaining worklist from a prior schedule, and/or location of the mobile reader/writer devices 12(1)-12(n), although other types and/or numbers of factors may be considered.

In step 104, the storage management computing device 15 provides the determined schedule to one or more of the mobile reader/writer devices 12(1)-12(n) in storage warehouse system 20(1) or mobile reader/writer device 12(2) in storage warehouse system 20(2). Based on the schedule received by each of the mobile reader/writer devices 12(1)-12(n) in storage warehouse system 20(1), the corresponding transport apparatus 28 may be engaged to adjustably position the corresponding one of the plurality of reader/writer devices 12(1)-12(n) to one of the plurality of different physical locations within the perimeter of the storage warehouse system 20(1) for the responsive one of the data storage devices 14(1)-14(n) on one of the shelves 18(1)-18(n). In another example, based on the schedule received, the transport apparatus 28 in mobile reader/writer device 12(2) in storage warehouse system 20(1) may activate the motor to engage the drive wheels 62 and then with the support wheels 65 move and/or rotate the mobile reader/writer device 12(2) in storage warehouse 20(2) into position with respect to one of the data storage devices 14(a1)-14(an) and 14(b1)-14(bn) on the shelf assembly 54(1). The linear image sensor 61 in the mobile reader/writer device 12(2) in storage warehouse 20(2) can be used to locate and align the mobile reader/writer device 12(2) over the desired one of the data storage devices 14(a1)-14(an) and 14(b1)-14(bn), although other types of location and/or alignment systems can be used. Since in this example the bus bars 51 and 52, the left and right insulating adapters 42 and 43, and each of the interface boards or other devices 41(a1)-41(an) and 41(b1)-41(bn) at one end of data storage devices 14(a1)-14(an) and 14(b1)-14(bn) are all positioned at one end to form a substantially planar surface, then the mobile reader/writer device 12(2) in storage warehouse system 20(2) can easily move around that substantially planar surface to a desired location for a data management operation.

In step 106, the corresponding one of the reader/writer arm device 30 of each of the plurality of reader/writer devices 12(1)-12(n) executing a received schedule is extended to a position to couple with the responsive one of the data storage devices 14(1)-14(n) on one of the shelves 18(1)-18(n) in storage warehouse systems 20(1). In another example, the reader/writer arm device 30 of the reader/writer device 12(2) executing a received schedule is extended to a position to couple with one of the interface boards or other devices 41(a1)-41(an) and 41(b1)-41(bn) at one end of one of the data storage devices 14(a1)-14(an) and 14(b1)-14(bn) in storage warehouse systems 20(1).

Next, once in position in storage warehouse system 20(1) the corresponding one of the reader/writer arm devices 30 of each of the plurality of reader/writer devices 12(1)-12(n) inductively couples power to the responsive one of the data storage devices 14(1)-14(n) on one of the shelves 18(1)-18(n). In another example, in storage warehouse system 20(2) power is coupled in another manner by the electromagnetic power contacts 64 detachably coupling when in position to the conductive bus bars 51 and 52 on opposing sides of the selected one of the data storage devices 14(a1)-14(an) and 14(b1)-14(bn) to couple power, although other manners for coupling power can be used.

In step 108, once power has been provided, in storage warehouse system 20(1) the corresponding one of the reader/writer arm devices 30 of each of the plurality of reader/writer devices 12(1)-12(n) may wirelessly or directly couple to the responsive one of the data storage devices 14(1)-14(n) on one of the shelves 18(1)-18(n) to execute the data management operation, such as a read of stored data or a write of data for storage using short-range wireless by way of example only, although other types of connections, such as wired connection could be used. In another example, in storage warehouse system 20(2) the reader/writer arm device 30 of the reader/writer devices 12(2) may wirelessly or directly couple to the responsive one of one of the data storage devices 14(a1)-14(an) and 14(b1)-14(bn) to execute the data management operation, such as a read of stored data or a write of data for storage using short-range wireless by way of example only, although other types of connections, such as wired connection could be used.

As illustrated and described by way of the examples herein, this technology provides an efficient and effective automated storage warehouse system. Example of this technology provide a new architecture for cold storage warehouses that involves rooms or other structures with shelves with flash memory cartridges on these shelves. To read or write data, the memory devices do not move, but instead autonomous reader/writer devices or other robots with extendable arms are positioned in proximity of a particular memory, power is coupled to the memory devices, and short-range wireless or direct connections are made to read/write data. By coupling power transfer and using high-throughput wireless or direct connections for data transfer, the prior need to relocate a storage cartridge to the tape drive and provide constant power is eliminated which significantly reduces costs and complexity.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A storage warehouse system comprising:
a plurality of data storage devices, each of the plurality of data storage devices is positioned between insulators, is at one of a plurality of different physical locations on one of one or more shelf assemblies, and comprises a processor coupled to a memory and an interface device;
a plurality of bus conductors, one of the plurality of bus conductors is adjacent each of the insulators for the plurality of storage devices on the one or more shelf assemblies;
a plurality of mobile reader/writer devices, each of the mobile reader/writer devices comprising:
a transport apparatus configured to physically move a corresponding one of the plurality of mobile reader/writer devices to one or more of the different physical locations on the one or more shelf assemblies when engaged;
a processor coupled to the transport apparatus and a memory containing machine readable medium comprising machine executable code having stored thereon instructions, the processor configured to execute the machine executable code to cause the processor to:
engage the transport apparatus to adjustably position the corresponding one of the plurality of mobile reader/writer devices to one of the plurality of different physical locations on the one or more shelf assemblies in response to a received data management operation;
couple power via the corresponding one of the plurality of reader/writer devices to one of the plurality of data storage devices at the one of the plurality of different physical locations for the one or more shelf assemblies; and
execute through the corresponding one of the plurality of mobile reader/writer devices the data management operation on the one of the plurality of data storage devices at the one of the plurality of different physical locations on the one or more shelf assemblies.

2. The system of claim 1 wherein at least one of the mobile reader/writer devices further comprises a reader/writer arm device coupled to the processor and configured to engage with the interface device of one of the plurality of mobile reader/writer devices based on current positioning.

3. The system of claim 1 wherein at least one of the mobile reader/writer devices further comprises a vacuum generator coupled to the processor and configured to keep the at least one of the mobile reader/writer devices physically attached to one of the one or more shelf assemblies when activated.

4. The system of claim 1 wherein at least one of the mobile reader/writer devices further comprises electromagnetic power contacts coupled to the processor and configured to couple electrical power to the one of the plurality of data storage devices when activated.

5. The system of claim 1 wherein the transport apparatus further comprises a motor coupled to at least one or more drive wheels.

6. A method for making a storage warehouse system, the method comprising:
positioning each of a plurality of data storage devices between insulators and at one of a plurality of different physical locations on one of one or more shelf assemblies, each of the plurality of data storage devices comprising a processor coupled to a memory and an interface device;
positioning one a plurality of bus conductors adjacent each of the insulators for the plurality of storage devices on the one or more shelf assemblies; providing a plurality of mobile reader/writer devices, each of the mobile reader/writer devices comprising:
a transport apparatus configured to physically move a corresponding one of the plurality of mobile reader/writer devices to one or more of the different physical locations on the one or more shelf assemblies when engaged;
a processor coupled to the transport apparatus and a memory containing machine readable medium comprising machine executable code having stored thereon instructions, the processor configured to execute the machine executable code to cause the processor to:
engage the transport apparatus to adjustably position the corresponding one of the plurality of mobile reader/writer devices to one of the plurality of different physical locations on the one or more shelf assemblies in response to a received data management operation;
couple power via the corresponding one of the plurality of reader/writer devices to one of the plurality of data storage devices at the one of the plurality of different physical locations for the one or more shelf assemblies; and
execute through the corresponding one of the plurality of mobile reader/writer devices the data management operation on the one of the plurality of data storage devices at the one of the plurality of different physical locations on the one or more shelf assemblies.

7. The method of claim 6 wherein the providing the plurality of mobile reader/writer devices further comprises providing at least one of the mobile reader/writer devices with a reader/writer arm device coupled to the processor and configured to engage with the interface device of one of the plurality of mobile reader/writer devices based on current positioning.

8. The method of claim 6 wherein the providing the plurality of mobile reader/writer devices further comprises providing at least one of the mobile reader/writer devices with a vacuum generator coupled to the processor and configured to keep the at least one of the mobile reader/writer devices physically attached to one of the one or more shelf assemblies when activated.

9. The method of claim 6 wherein the providing the plurality of mobile reader/writer devices further comprises providing at least one of the mobile reader/writer devices with electromagnetic power contacts coupled to the processor and configured when activated to couple electrical power to the one of the plurality of data storage devices.

10. The method of claim 6 wherein the transport apparatus further comprises a motor coupled to at least one or more drive wheels.

* * * * *